(12) United States Patent
Adams

(10) Patent No.: US 7,473,063 B1
(45) Date of Patent: Jan. 6, 2009

(54) TRAILER STRAP BRACKET SYSTEM

(76) Inventor: Bill J. Adams, 2717 40th Ave. North, Fargo, ND (US) 58102

( * ) Notice: Subject to any disclaimer, the term of this patent is extended or adjusted under 35 U.S.C. 154(b) by 394 days.

(21) Appl. No.: 11/336,069

(22) Filed: Jan. 20, 2006

(51) Int. Cl.
*B61D 45/00* (2006.01)

(52) U.S. Cl. .................................................. 410/116

(58) Field of Classification Search .................. 410/96, 410/97, 101, 106, 116
See application file for complete search history.

(56) References Cited

U.S. PATENT DOCUMENTS

| | | | |
|---|---|---|---|
| 3,259,353 A | 7/1966 | Webb | 248/361 |
| 3,429,537 A | 2/1969 | Jantzen | 248/223 |
| 4,715,754 A | 12/1987 | Scully | 410/107 |
| 4,818,162 A | 4/1989 | Zukowski et al. | 410/116 |
| 5,388,938 A | 2/1995 | Helton | 410/101 |
| 5,416,956 A | 5/1995 | Rubin | 24/601.4 |
| 5,443,341 A | 8/1995 | Hamilton | 410/116 |
| 5,516,246 A | 5/1996 | Helton | 410/101 |
| 5,807,045 A | 9/1998 | Profit | 410/116 |
| 5,836,060 A | 11/1998 | Profit | 24/698.2 |
| 5,888,040 A | 3/1999 | Walsh et al. | 410/100 |
| 5,967,720 A | 10/1999 | Profit | 410/116 |
| 5,993,127 A | 11/1999 | Shinn | 410/100 |
| 6,015,250 A * | 1/2000 | Walsh et al. | 410/100 |
| 6,168,360 B1 | 1/2001 | Knox | 410/96 |
| 6,626,623 B2 | 9/2003 | DeLay | 410/116 |
| 7,160,069 B2 * | 1/2007 | Adams | 410/104 |

* cited by examiner

*Primary Examiner*—H Gutman (57) ABSTRACT

A trailer strap bracket system for effectively and securely connecting a hook of a trailer strap to a trailer. The trailer strap bracket system includes a frame including an opening and an upper end attached to a trailer, and a catch member extending rearwardly and upwardly from the frame for receiving a hook from a strap. The frame includes a lower portion that is rounded for receiving a portion of the strap when the hook of the strap is attached to the catch member.

13 Claims, 12 Drawing Sheets

TRAILER STRAP BRACKET SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to semi-truck trailer straps and more specifically it relates to a trailer strap bracket system for effectively and securely connecting a hook of a trailer strap to a trailer.

2. Description of the Related Art

Any discussion of the prior art throughout the specification should in no way be considered as an admission that such prior art is widely known or forms part of common general knowledge in the field.

Trailer straps (e.g. ratchet strap assemblies, web straps) have been in use for years. Conventional trailer straps are each comprised of a flat band of elongated material that are adjustably attached to a winch at one end and with a hook (e.g. flat hook) attached to the opposing end of the strap. The distal end of the elongated strap containing the hook is thrown over the load transported on the trailer. The hook is then loosely secured on a downward or horizontal extending lip on the frame of the trailer. The main problem with conventional systems of securing trailer straps is that if the straps become loosened, the hook is susceptible to complete removal from the trailer thereby allowing the load to shift or fall off the trailer.

While these devices may be suitable for the particular purpose to which they address, they are not as suitable for effectively and securely connecting a hook of a trailer strap to a trailer. Conventional trailer strap securing systems are susceptible to loosening and having the hook being removed from the trailer.

In these respects, the trailer strap bracket system according to the present invention substantially departs from the conventional concepts and designs of the prior art, and in so doing provides an apparatus primarily developed for the purpose of effectively and securely connecting a hook of a trailer strap to a trailer.

BRIEF SUMMARY OF THE INVENTION

In view of the foregoing disadvantages inherent in the known types of trailer strap securing systems now present in the prior art, the present invention provides a new trailer strap bracket system construction wherein the same can be utilized for effectively and securely connecting a hook of a trailer strap to a trailer.

The general purpose of the present invention, which will be described subsequently in greater detail, is to provide a new trailer strap bracket system that has many of the advantages of the trailer strap securing systems mentioned heretofore and many novel features that result in a new trailer strap bracket system which is not anticipated, rendered obvious, suggested, or even implied by any of the prior art trailer strap securing systems, either alone or in any combination thereof.

To attain this, the present invention generally comprises a frame including an opening and an upper end attached to a trailer, and a catch member extending rearwardly and upwardly from the frame for receiving a hook from a strap. The frame includes a lower portion that is rounded for receiving a portion of the strap when the hook of the strap is attached to the catch member.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a trailer strap bracket system that will overcome the shortcomings of the prior art devices.

A second object is to provide a trailer strap bracket system for effectively and securely connecting a hook of a trailer strap to a trailer.

Another object is to provide a trailer strap bracket system that may be utilized upon various types of trailers.

An additional object is to provide a trailer strap bracket system that prevents a hook from becoming dislodged when the strap becomes loosened.

A further object is to provide a trailer strap bracket system that reduces the chance of shifting or loss of a load on a trailer.

Another object is to provide a trailer strap bracket system that is not complex and is easy to utilize for truck drivers.

A further object is to provide a trailer strap bracket system that increases road safety for vehicles traveling near a truck pulling a trailer with a load secured by straps.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Turning now descriptively to the drawings, in which similar reference characters denote similar elements throughout the several views, FIGS. 1 through 9 illustrate a trailer strap bracket system 10, which comprises a frame 20 including an opening 22 and an upper end 24 attached to a trailer 16, and a catch member 30 extending rearwardly and upwardly from the frame 20 for receiving a hook from a strap 12. The frame 20 includes a lower portion 23 that is rounded for receiving a portion of the strap 12 when the hook of the strap 12 is attached to the catch member 30.

Figure 4:
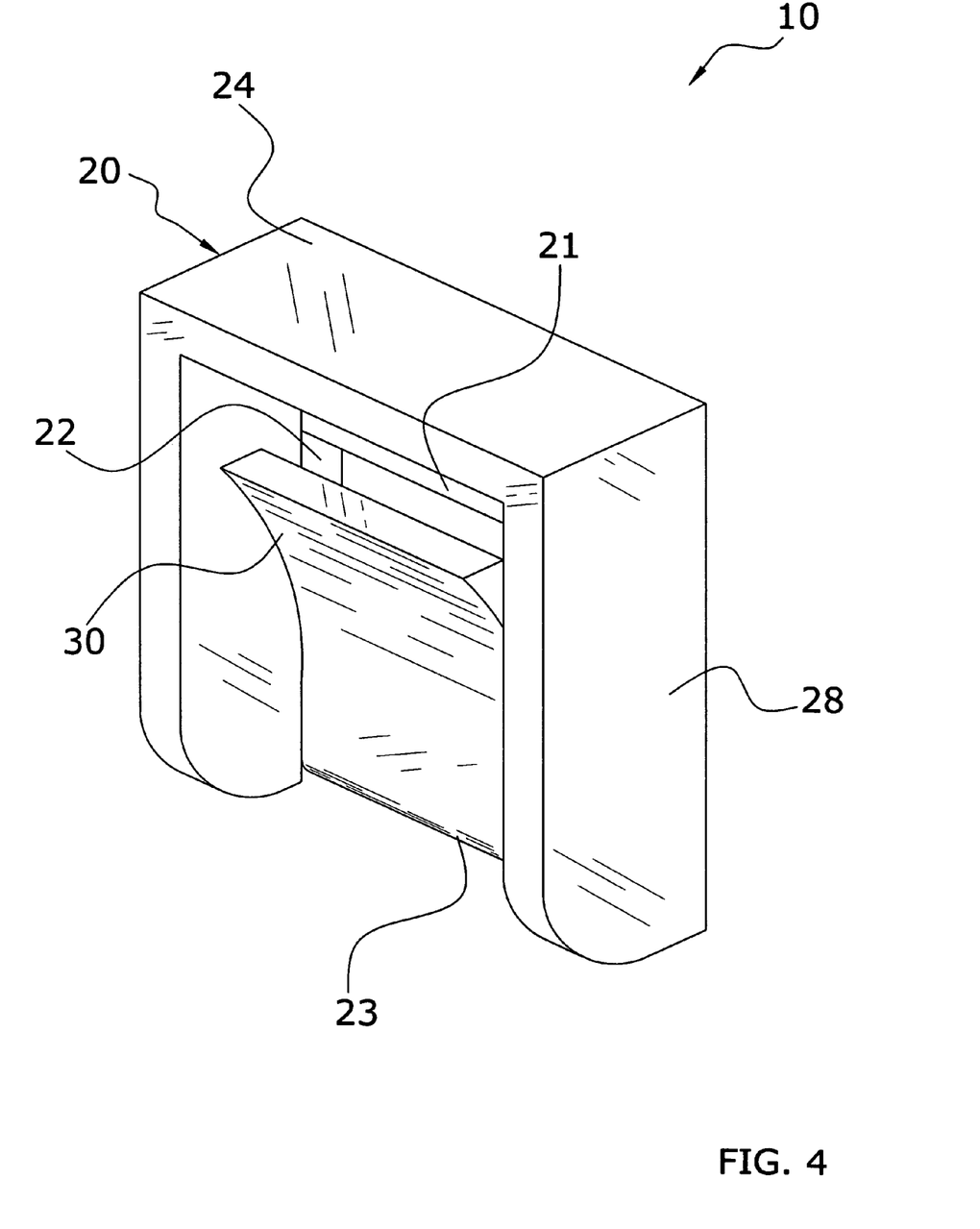
FIG. 4 is a rear upper perspective view of the present invention.
Figure 5:
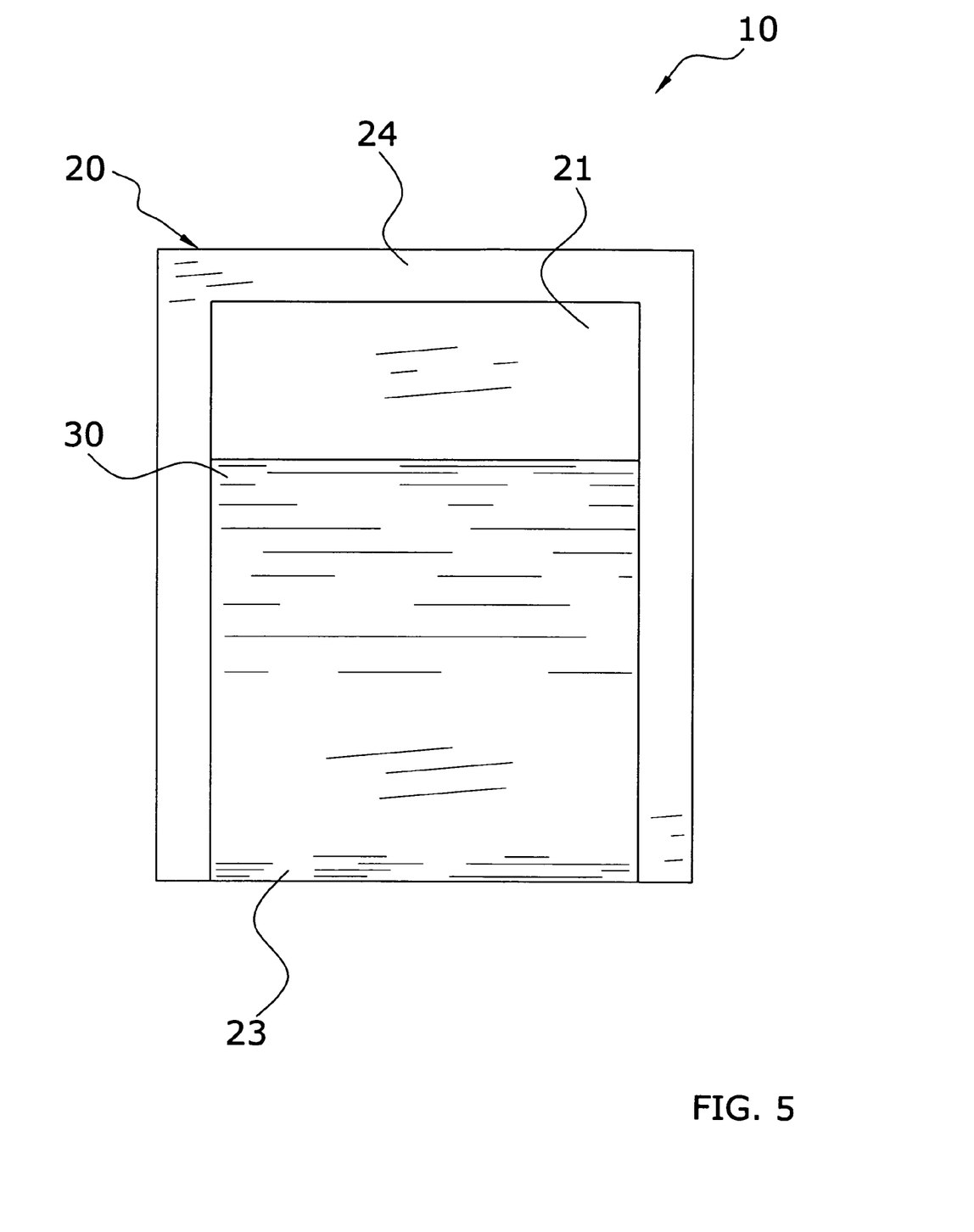
FIG. 5 is a rear view of the present invention.

The frame 20 is comprised of a outer surface (FIG. 1) and an inner surface (FIG. 4). The frame 20 preferably includes a first sidewall 26 and a second sidewall 28 defining a U-shaped horizontal cross sectional structure for the frame 20 as best illustrated in FIG. 4 of the drawings. The first sidewall 26 and the second sidewall 28 are preferably substantially parallel to one another as best illustrated in FIG. 5 of the drawings. The frame 20 preferably includes an upper end 24 extending between the first sidewall 26 and the second sidewall 28 as illustrated in FIG. 4.

Figure 8:
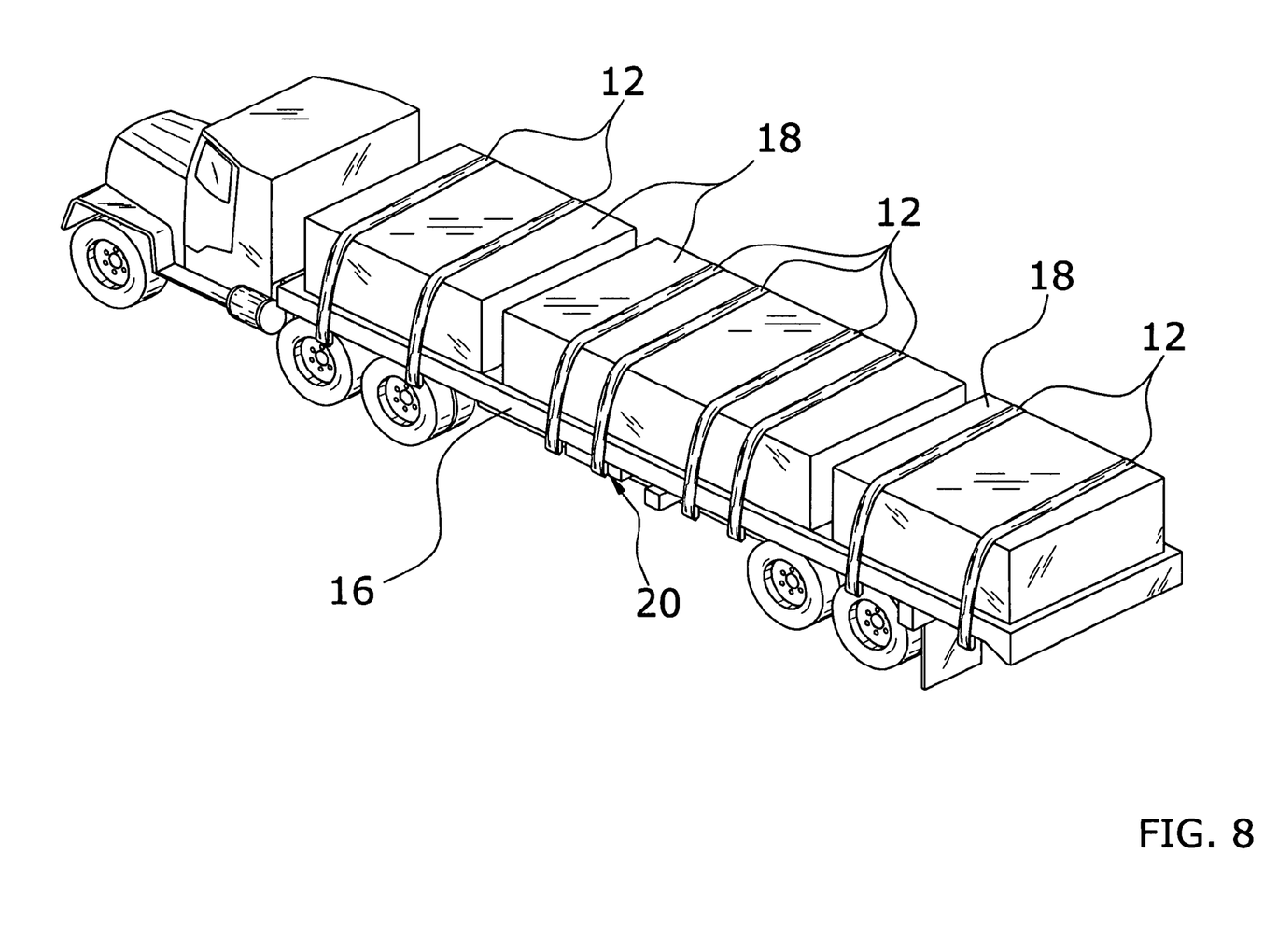
FIG. 8 is an upper perspective view of a plurality of the present invention attached to the trailer and with a plurality of corresponding straps secured to the same with a load secured on the trailer.
Figure 9:
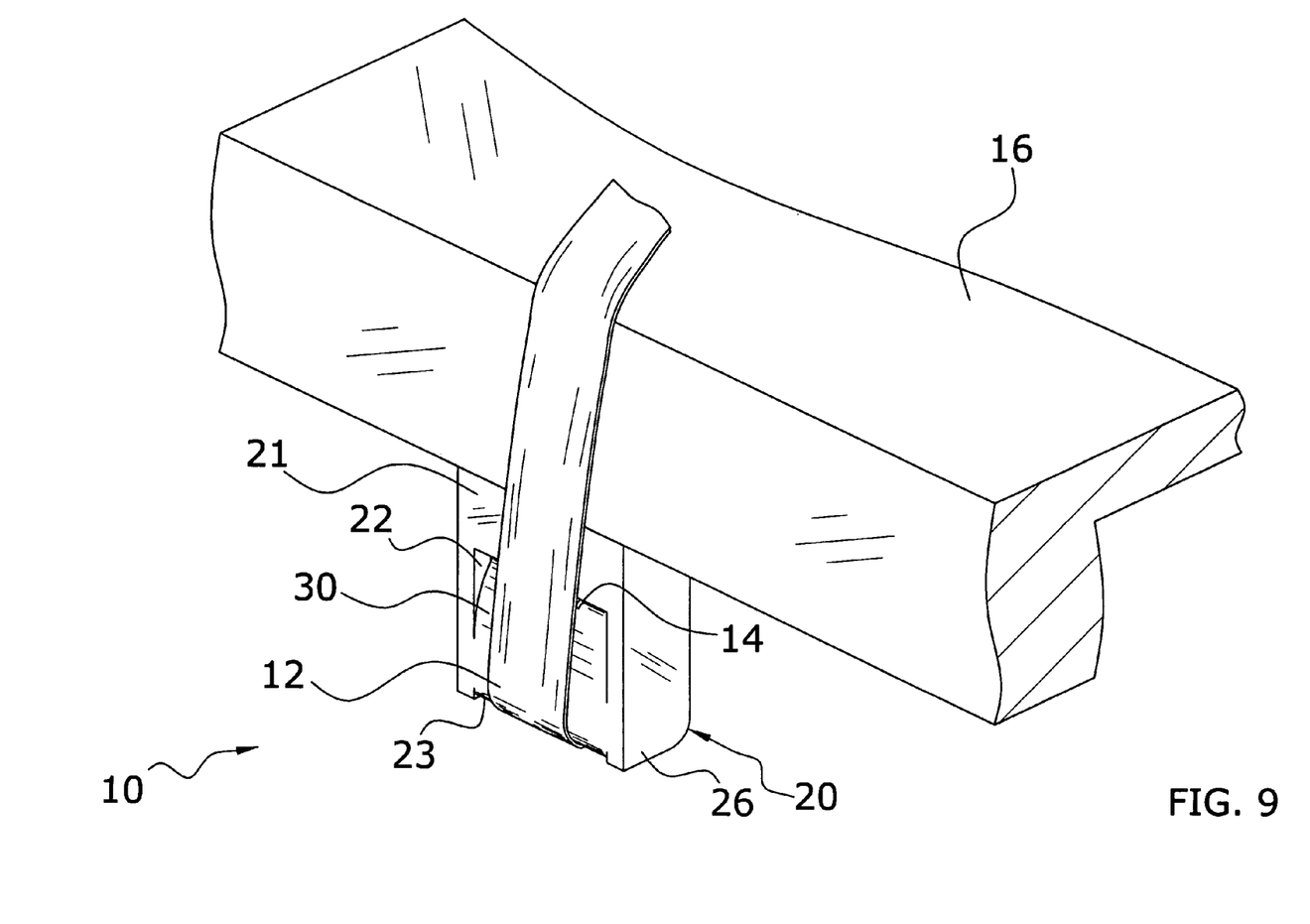
FIG. 9 is a front upper perspective view of the present invention attached to a trailer.

The upper end 24 is preferably attached to a lower surface of a trailer 16 via various securing means (e.g. welding, fasteners, etc.) as illustrated in FIG. 8 of the drawings. Other portions of the frame 20 may be attached to the frame 20 other than the upper end 24.

Figure 1:
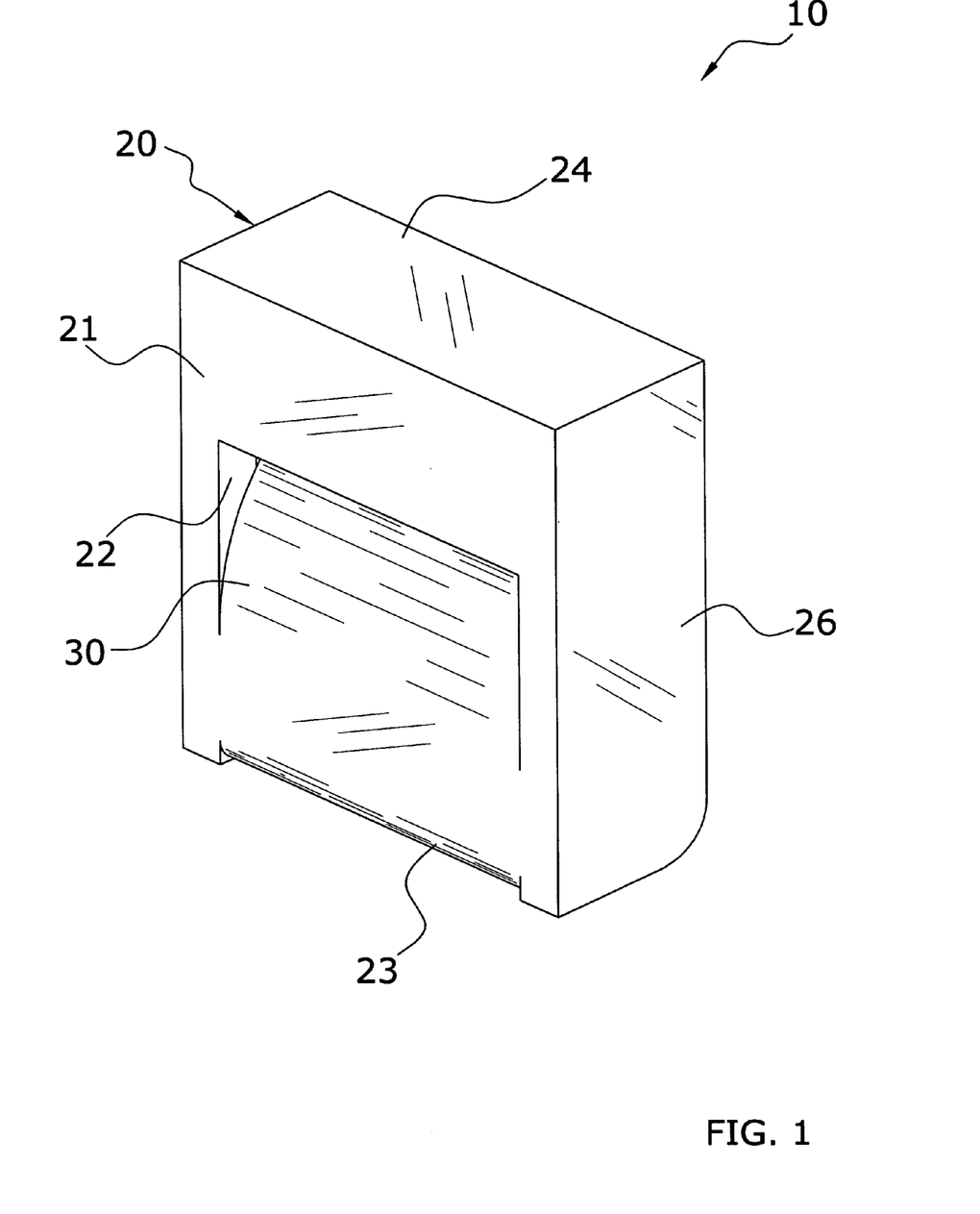
FIG. 1 is a front upper perspective view of the present invention.
Figure 2:
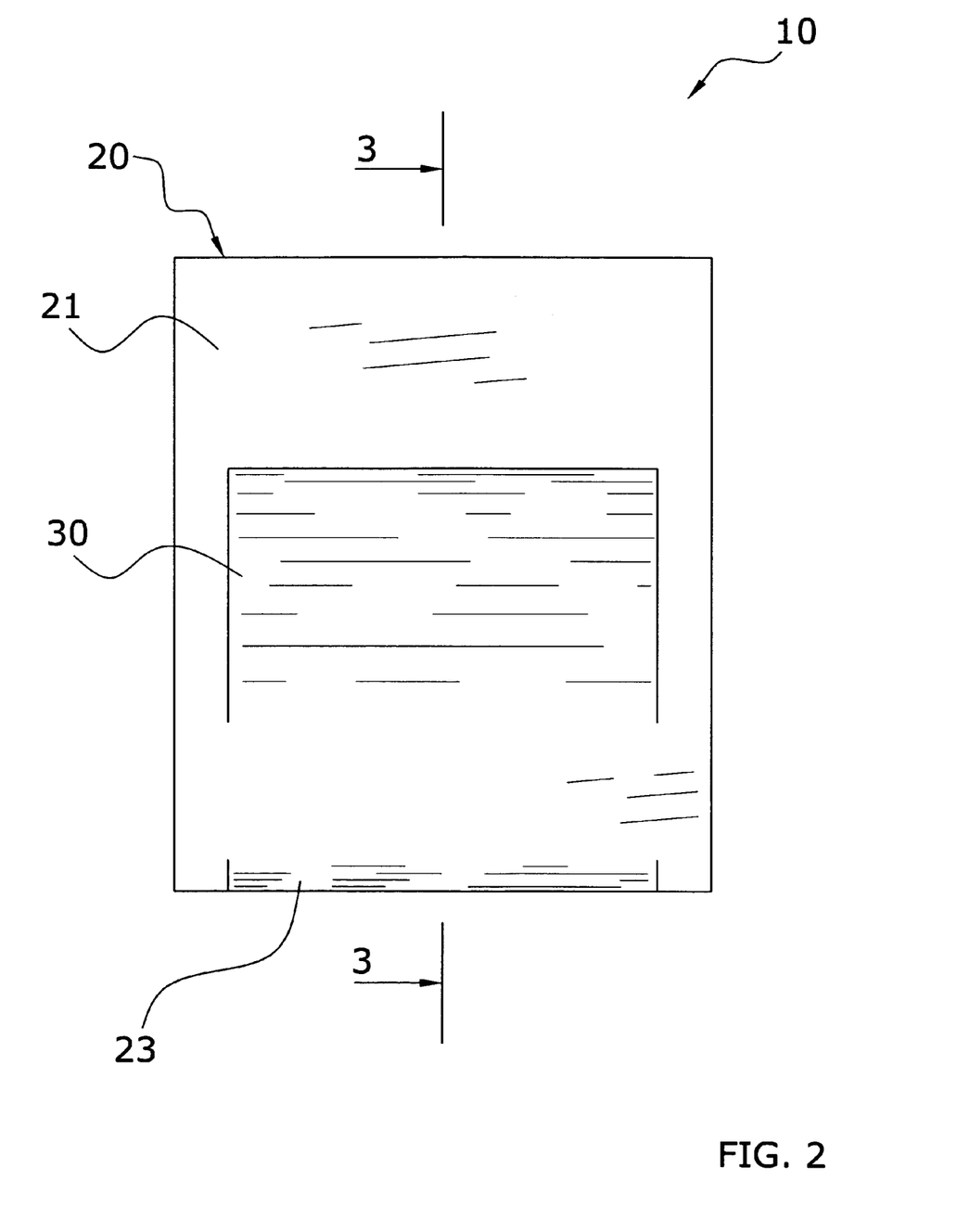
FIG. 2 is a front view of the present invention.
Figure 3:
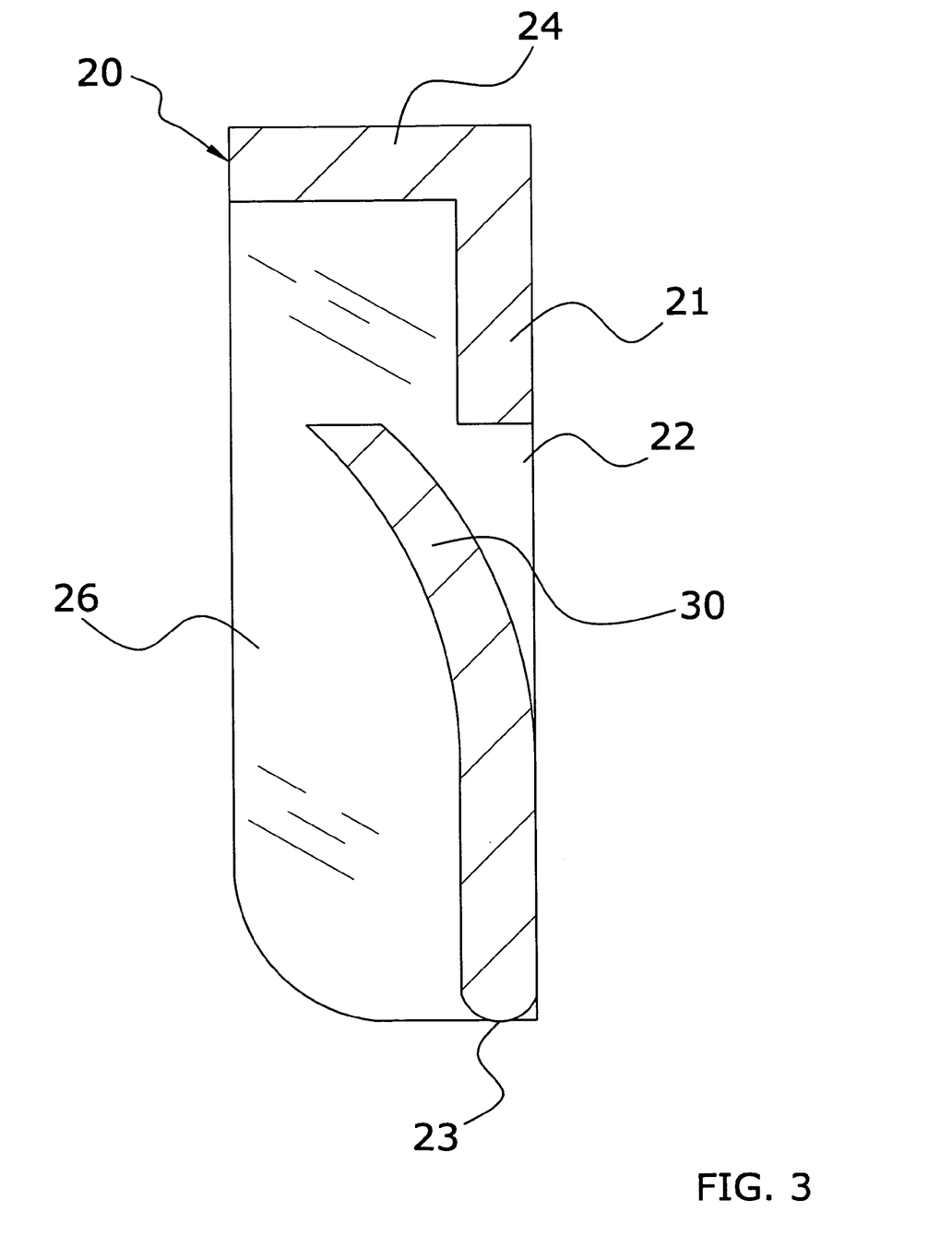
FIG. 3 is a cross sectional view taken along line 3-3 of FIG. 2.
Figure 7A:
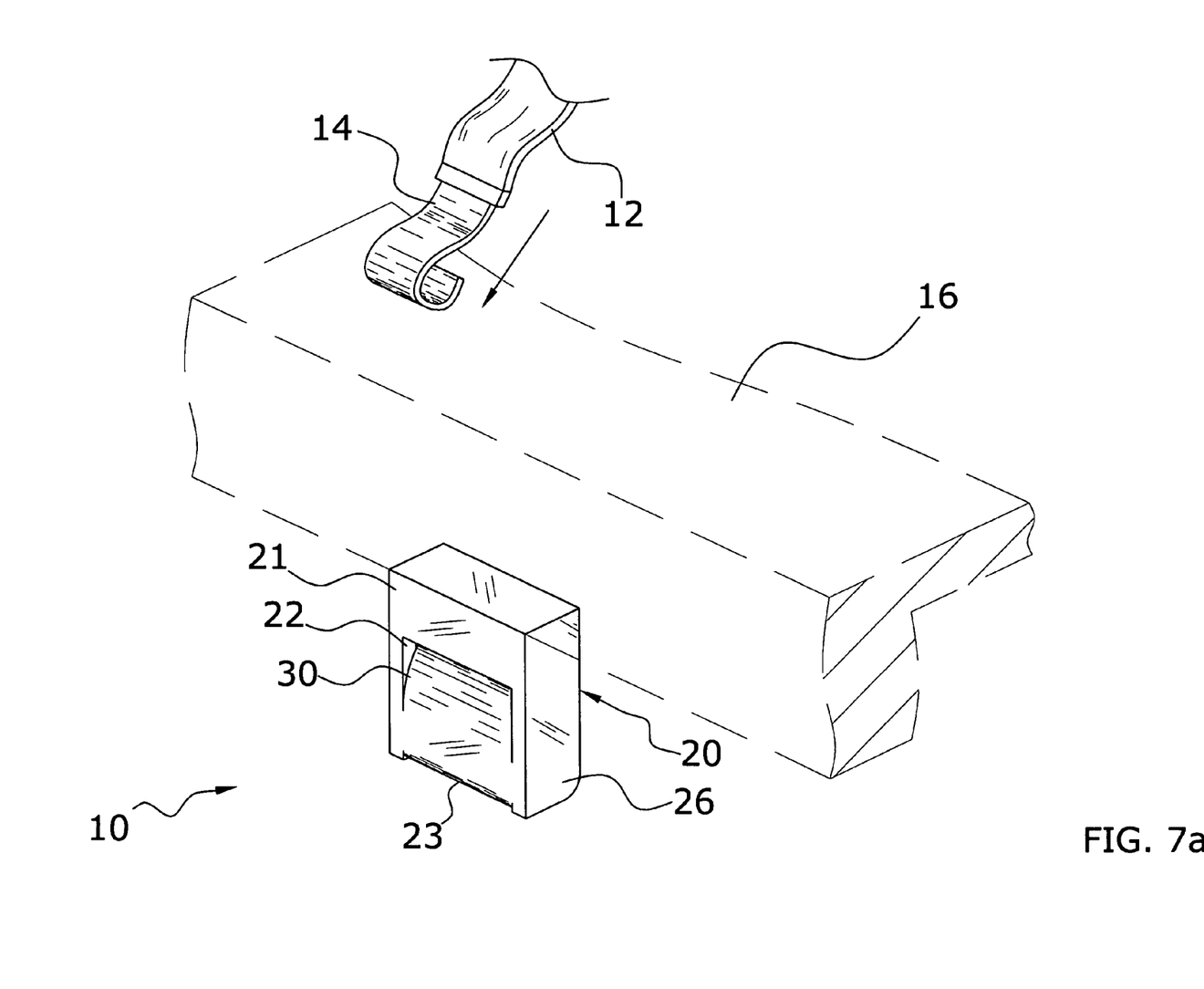
FIG. 7a is a front upper perspective view of the present invention with a hook being extended downwardly with respect to the trailer and the present invention.
Figure 7B:
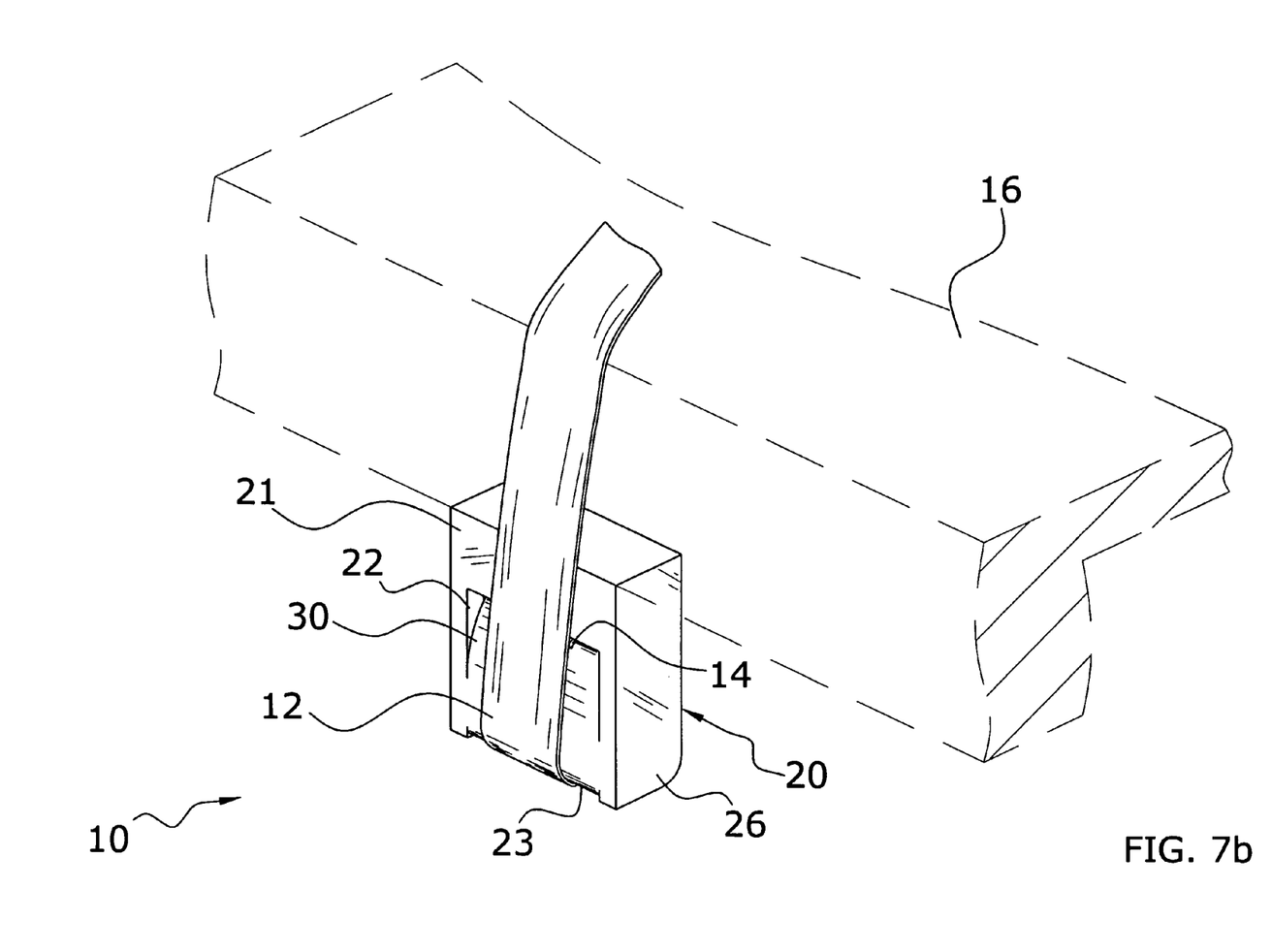
FIG. 7b is a front upper perspective view of the present invention with a hook secured within the present invention.

The frame 20 preferably includes an upper portion 21 extending between the sidewalls 26, 28 and attached to the upper end 24 as best illustrated in FIGS. 1 and 3 of the drawings. The frame 20 also preferably includes a lower portion 23 extending between the sidewalls 26, 28 as best illustrated in FIGS. 1 and 2 of the drawings. The lower portion 23 of the frame 20 is preferably comprised of a rounded structure to receive a portion of the strap 12 without damaging the strap 12. The sidewalls 26, 28 preferably extend downwardly past said lower portion 23 forming a side barrier for the strap 12 when the strap 12 is positioned about the lower portion 23 as best illustrated in FIG. 7b of the drawings.

As best illustrated in FIGS. 1, 2 and 3 of the drawings, an opening 22 preferably extends within the frame 20 exposing an upper section of the catch member 30. The opening 22 receives a distal portion of the flat hook 14 when the flat hook 14 is attached to the catch member 30 as illustrated in FIG. 7b of the drawings.

The catch member 30 extends inwardly and upwardly from the frame 20 as best illustrated in FIGS. 3 and 4 of the drawings. Alternatively, the catch member 30 may be directly attached to an inner vertical surface of the trailer 16. The catch member 30 is adapted for receiving the flat hook 14 from the strap 12 as further shown in FIGS. 3 and 4 of the drawings. The catch member 30 is preferably comprised of a relatively consistent thickness and is comprised of generally flat opposing surfaces as illustrated in FIG. 3 of the drawings. The catch member 30 is preferably comprised of an inwardly curved structure as further illustrated in FIG. 3 of the drawings.

Figure 6A:
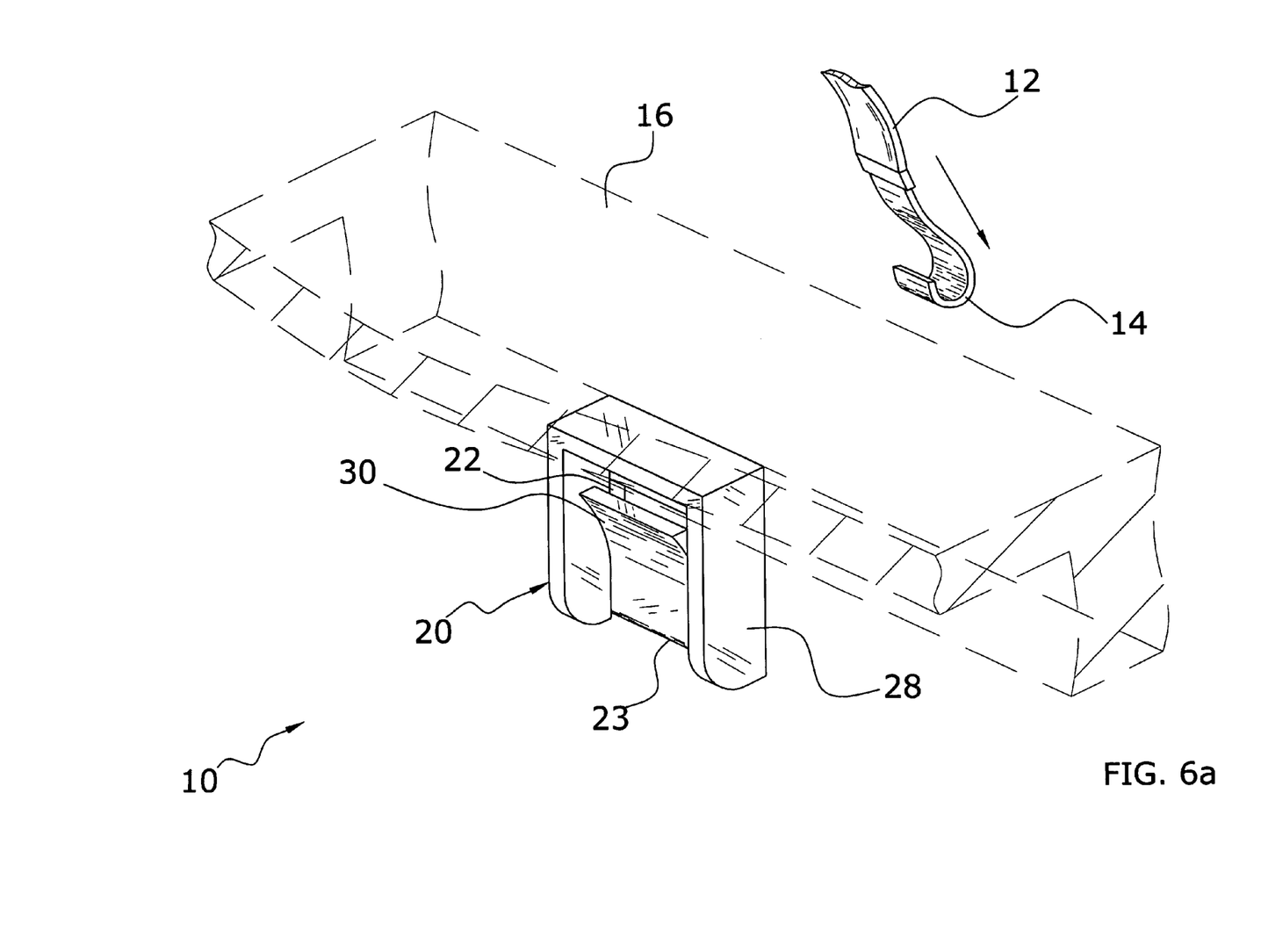
FIG. 6a is a rear upper perspective view of the present invention with a hook being extended downwardly with respect to the trailer and the present invention.
Figure 6B:
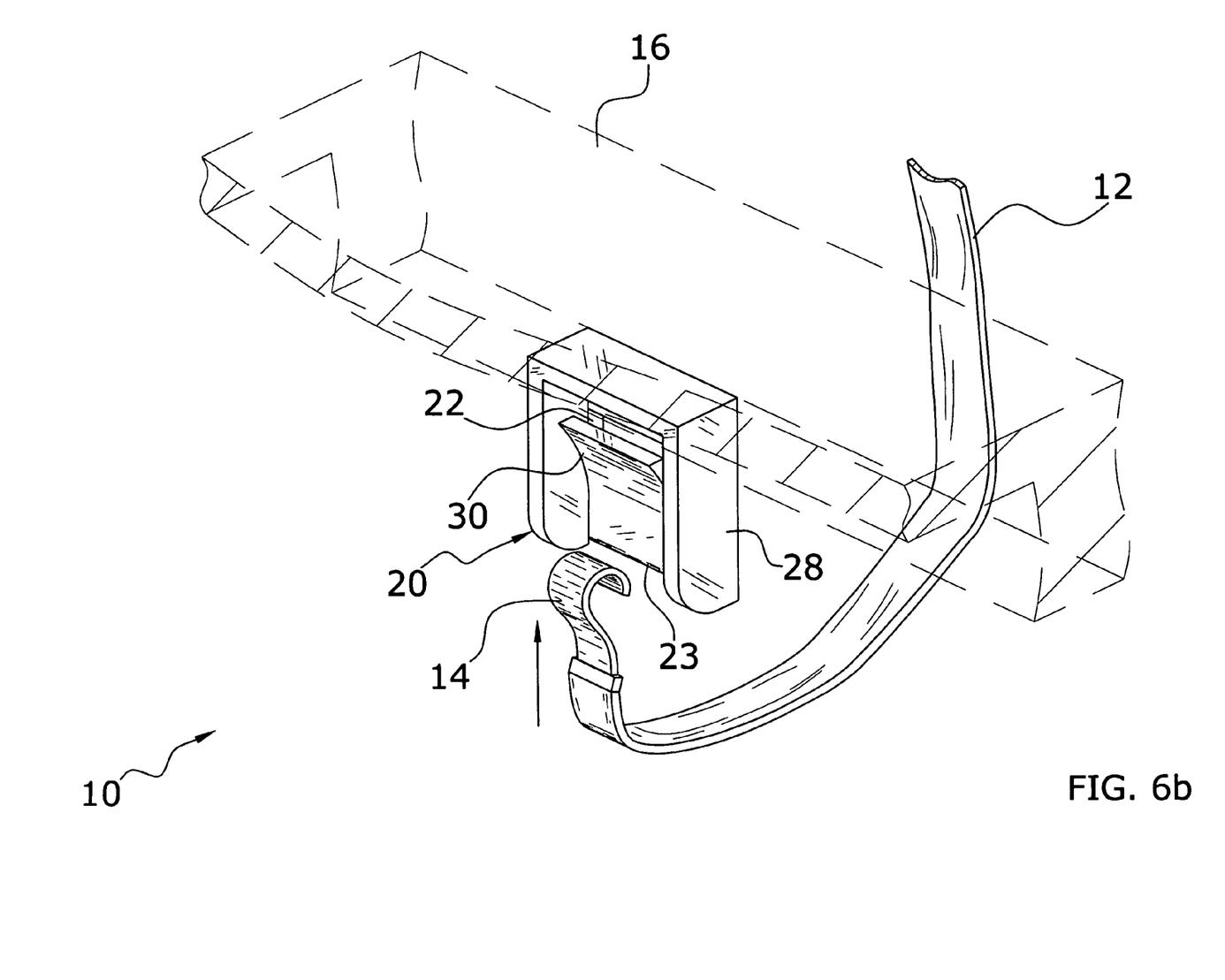
FIG. 6b is a rear upper perspective view of the present invention with a hook being extended upwardly on the rear portion of the present invention.
Figure 6C:
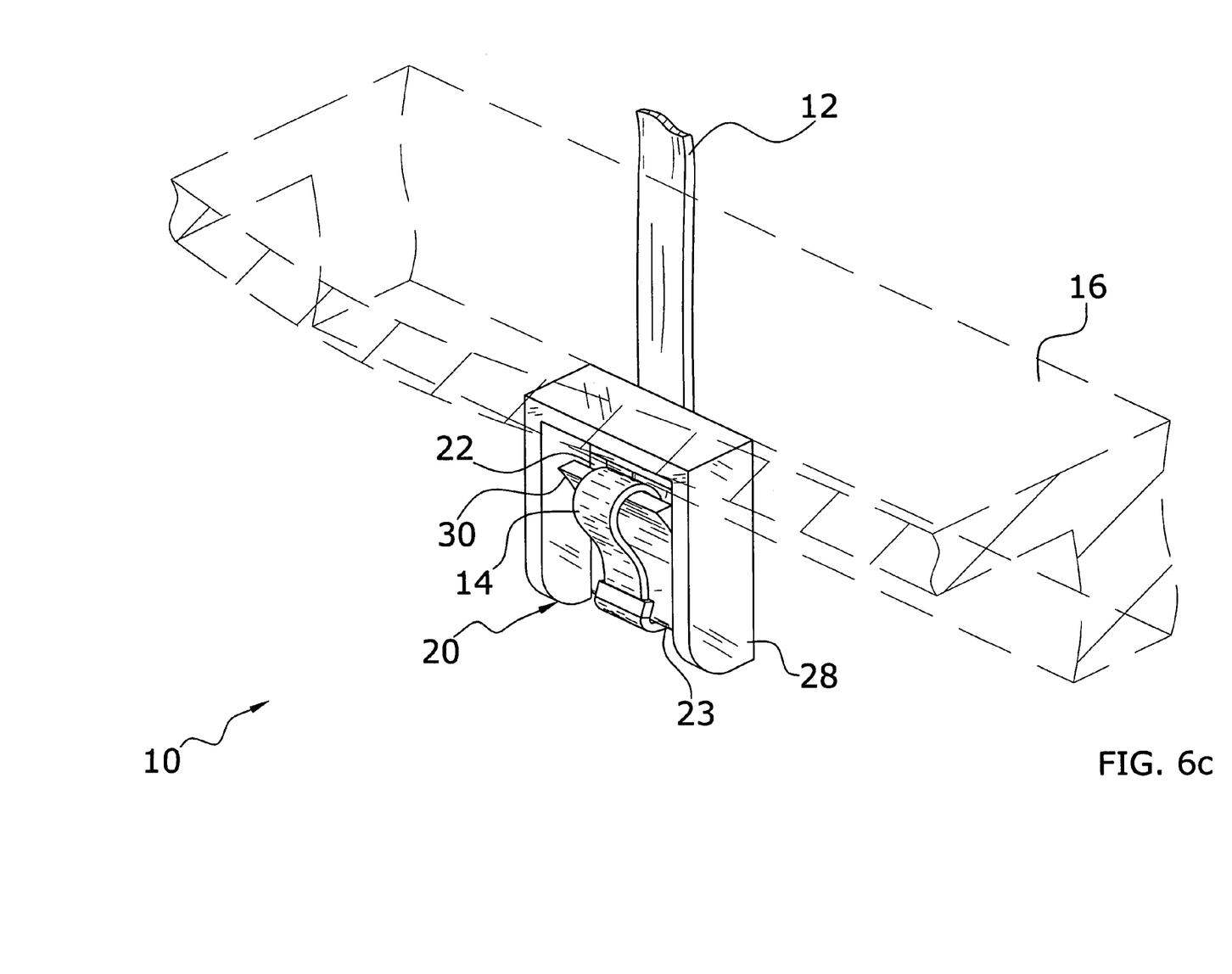
FIG. 6c is a rear upper perspective view of the present invention with a hook secured within the present invention.

In use, a plurality of the present invention are attached to a side of an existing or a new trailer 16 as illustrated in FIG. 8 of the drawings. If ratchet straps are utilized with opposing flat hooks 14, then the present invention is attached to both sides of the trailer 16. The load 18 is positioned upon the upper surface of the trailer 16 as shown in FIG. 8 of the drawings. The straps 12 from the opposing side of the trailer 16 are extended over the trailer 16 and the load 18 as shown in FIG. 8. The flat hook 14 of each strap 12 is thereafter extended about the outside of the frame 20 of the present invention as shown in FIGS. 6a and 7a of the drawings. Once the flat hook 14 is below the present invention, the flat hook 14 is then manipulated inwardly and upwardly towards the inside of the present invention as illustrated in FIG. 6b of the drawings. The flat hook 14 is then hooked to the catch member 30 as shown in FIGS. 6c and 7b of the drawings. The weight of the flat hook 14 and a portion of the strap 12 maintain the flat hook 14 in the fully engaged position with respect to the catch member 30. The strap 12 is thereafter tightened. This process is continued until each of the straps 12 are properly tightened over the load 18. When the trailer 16 is pulled by a semi-truck, the straps 12 may become loosened for various reasons. When the strap 12 becomes loose, the weight of the flat hook 14 and a portion of the strap 12 maintains the flat hook 14 in the secured position on the catch member 30 as illustrated in FIGS. 6c and 7b of the drawings. When the load 18 is to be removed, the straps 12 are loosened and the flat hook 14 is lifted upwardly for easy removal from the present invention.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

I claim:

1. A trailer strap bracket system, comprising:
   a catch member extending inwardly and upwardly from a frame of a trailer; and
   wherein said catch member is adapted for receiving a flat hook from a strap when said strap extends past an outside portion of said frame continuing to engage a lower portion of said frame, wherein said catch member is comprised of an inwardly curved structure.

2. The trailer strap bracket system of claim 1, wherein said lower portion of said frame is comprised of a rounded structure.

3. The trailer strap bracket system of claim 1, including a first sidewall and a second sidewall attached to opposing sides of said catch member.

4. A trailer strap bracket system, comprising:
   a frame comprising a outer surface and an inner surface, wherein said frame is attached to a trailer; and
   a catch member extending inwardly and upwardly from said frame, wherein said catch member is adapted for receiving a flat hook from a strap, wherein said frame is comprised of an inverted U-shaped structure with an upper portion extending between a first sidewall and a second sidewall.

5. The trailer strap bracket system of claim 4, wherein said frame includes a lower portion, wherein said lower portion of said frame is comprised of a rounded structure such than when said strap extends past said outer surface of said frame said strap continues to engage said lower portion when said flat hook is attached to said catch member.

6. The trailer strap bracket system of claim 4, wherein said catch member is comprised of an inwardly curved structure.

7. The trailer strap bracket system of claim 4, including a first sidewall and a second sidewall attached to opposing sides of said catch member.

8. The trailer strap bracket system of claim 7, wherein said first sidewall and said second sidewall are substantially parallel to one another.

9. The trailer strap bracket system of claim 4, including an opening within said frame exposing an upper section of said catch member.

10. The trailer strap bracket system of claim 4, wherein said frame includes an upper end, wherein said upper end is attached to said trailer.

11. A trailer strap bracket system, comprising:
    a frame comprising a outer surface, an inner surface, a first sidewall, a second sidewall, an upper end and a lower portion, wherein said lower portion of said frame is comprised of a rounded structure, and wherein said frame is attached to a trailer;
    wherein said upper end is attached to said trailer;
    a catch member extending inwardly and upwardly from said frame, wherein said catch member is adapted for receiving a flat hook from a strap when said strap extends past said outer surface of said frame said strap continues to engage said lower portion, wherein said catch member is comprised of an inwardly curved structure; and
    an opening within said frame exposing an upper section of said catch member.

12. The trailer strap bracket system of claim 11, wherein said first sidewall and said second sidewall are substantially parallel to one another.

13. The trailer strap bracket system of claim 11, wherein said frame is comprised of an inverted U-shaped structure with an upper portion extending between said first sidewall and said second sidewall.

\* \* \* \* \*